(12) United States Patent
Murata

(10) Patent No.: US 8,270,183 B2
(45) Date of Patent: Sep. 18, 2012

(54) CHASSIS STRUCTURE AND ELECTRONIC APPARATUS

(75) Inventor: Morihiro Murata, Saitama (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 12/685,930

(22) Filed: Jan. 12, 2010

(65) Prior Publication Data

US 2010/0220433 A1 Sep. 2, 2010

(30) Foreign Application Priority Data

Feb. 27, 2009 (JP) .................................. 2009-047029

(51) Int. Cl.
*H05K 5/00* (2006.01)
(52) U.S. Cl. ........ 361/832; 361/724; 361/727; 174/365; 174/378
(58) Field of Classification Search .................. 174/365, 174/378; 361/832
See application file for complete search history.

(56) References Cited

U.S. PATENT DOCUMENTS

| | | | | |
|---|---|---|---|---|
| 5,303,823 A | * | 4/1994 | Niles et al. .................... | 206/394 |
| 5,742,359 A | * | 4/1998 | Han .............................. | 348/836 |
| 6,041,956 A | * | 3/2000 | Kao .............................. | 220/4.02 |
| 6,385,054 B1 | * | 5/2002 | Vesamaki et al. ............. | 361/816 |
| 6,390,320 B2 | * | 5/2002 | Hurst et al. .................... | 220/241 |
| 6,469,904 B1 | * | 10/2002 | Vigeant et al. ................. | 361/752 |
| 6,550,877 B1 | * | 4/2003 | Anderson et al. ........... | 312/223.2 |
| 6,741,459 B2 | * | 5/2004 | Imamura ................... | 361/679.58 |
| 6,837,554 B2 | * | 1/2005 | Yamamoto et al. ......... | 312/223.2 |
| 7,041,896 B2 | * | 5/2006 | Okamoto ...................... | 174/480 |
| 7,072,174 B2 | * | 7/2006 | Iwai ......................... | 361/679.01 |
| 7,435,915 B2 | * | 10/2008 | Irie .............................. | 174/369 |
| 7,581,303 B2 | * | 9/2009 | Soule et al. ..................... | 29/592 |
| 7,889,515 B2 | * | 2/2011 | Boetto et al. .................. | 361/818 |
| 2008/0049411 A1 | * | 2/2008 | Wang et al. ................... | 361/818 |
| 2009/0141470 A1 | * | 6/2009 | Hamada et al. ............... | 361/816 |

FOREIGN PATENT DOCUMENTS

| | | |
|---|---|---|
| JP | 3095551 | 5/2003 |
| JP | 2006-165412 | 6/2006 |
| JP | 2008-91275 | 4/2008 |

* cited by examiner

*Primary Examiner* — Anthony Q Edwards
(74) *Attorney, Agent, or Firm* — Oblon, Spivak, McClelland, Maier & Neustadt, L.L.P.

(57) ABSTRACT

A chassis structure includes a chassis member including a receiving portion and a case member including a contact surface portion mounted on the receiving portion. The contact surface portion is not fixed to the receiving portion but is movably supported by the receiving portion. A positioning portion protruding in a direction intersecting a direction extending along the surface of the contact surface portion is provided in the receiving portion, and the case member is mounted on the chassis member while an edge of the contact surface portion is in contact with the positioning portion.

7 Claims, 12 Drawing Sheets

CHASSIS STRUCTURE AND ELECTRONIC APPARATUS

BACKGROUND OF THE INVENTION

1. Field of the Invention

The present invention relates to a chassis structure constituted by a combination of a chassis member having a receiving portion and a case member having a contact surface portion mounted on the receiving portion, and an electronic apparatus including the chassis structure. In particular, the present invention relates to a chassis structure and an electronic apparatus in which, when an external force is applied to the chassis member or the case member, the external force applied to one member is received by the other member, deformation of each member can be prevented or suppressed, and the leak of unnecessary radiation (electromagnetic waves) can be reduced.

2. Description of the Related Art

Generally, an electronic apparatus includes an electronic apparatus main body having a main function of the electronic apparatus, and the electronic apparatus main body is supported by a chassis structure having a suitable configuration.

For example, a chassis structure of an electronic apparatus such as a DVD player and a terrestrial digital tuner of a TV is configured to include a metal frame on which the electronic apparatus main body is mounted, a panel which is attached to the metal frame and covers the entire electronic apparatus main body, and the like. In recent years, this type of electronic apparatus is produced so as to have a light-weight from the viewpoint of reduction of transportation cost to be paid by a user, ease of installation when starting to use, and the like. To reduce the cost of an electronic apparatus, reducing the amount of materials to be used is effective. Because of the above reasons, the plate thickness of a frame and a panel of an electronic apparatus is reduced, and hence the strength of the frame and the panel decreases. To prevent or suppress the decrease in the strength due to the reduction of the plate thickness, generally, many ideas regarding, for example, how to fold the frame and the panel or how to form a rib have been implemented. However, the decrease in strength due to the reduction of plate thickness can only be suppressed to a certain degree.

In the related art, as a chassis structure of this type of electronic apparatus, for example, there is a chassis structure described in Registered Utility Model Publication No. 3095551 (Utility Model Application No. 2003-363). In Registered Utility Model Publication No. 3095551, there is a description related to a shield structure of a disk apparatus in which unnecessary radiation of electromagnetic waves from the disk apparatus reproducing an optical disk is reduced, and electromagnetic interference is prevented.

The shield structure of the disk apparatus related to Registered Utility Model Publication No. 3095551 is configured to include a housing, a disk drive apparatus, a clamp holder, and a leaf spring. The housing of the disk apparatus includes a front panel made of resin, a back panel made of metal, an upper case made of metal, and a lower case made of metal. The disk drive apparatus is mounted on the center portion of the lower case of the housing, and a clamp holder made of metal having a substantially squared U-shape in cross section is attached to a position near the front panel in a space under the disk drive apparatus. The clamp holder and one end of the leaf spring are fixed together to the housing by a screw, and the other end of the leaf spring is in contact with the upper case, so that the clamp holder and the upper case are electrically connected by the leaf spring.

According to the shield structure of Registered Utility Model Publication No. 3095551, it is possible to electrically connect the clamp holder and the upper case and shield a connection cable with the clamp holder made of metal and the lower case made of metal. Therefore, an effect is expected in which unnecessary radiation of electromagnetic waves from a disk apparatus to which a front loading type disk drive apparatus is mounted and a front panel made of resin is attached is reduced, and electromagnetic interference to other electronic apparatuses is prevented.

However, in the shield structure of the disk apparatus described in Registered Utility Model Publication No. 3095551, there is a problem as described below. The problem in the related art will be described with reference to FIGS. 11A to 11C and FIGS. 12A and 12B. In FIGS. 11A to 11C, reference numeral 1 denotes a front frame made of metal, and a receiving portion 1a formed by folding and bending in a predetermined width in a horizontal direction is provided in an upper part of the front frame 1. A contact surface portion 2a provided at the top edge of the upper case 2 made of metal is mounted on the upper surface of the receiving portion 1a. The front frame 1 and the upper case 2 are fixed to the lower case made of metal (not shown in the figures) by screws in a side portion and a rear portion which are not seen from the front.

On the other hand, a portion where the receiving portion 1a of the front frame 1 and the contact surface portion 2a of the upper case 2 are in contact with each other is a portion located in an upper front area which is easy to see, and hence the receiving portion 1a and the contact surface portion 2a are not fixed by screws, and are simply in contact with each other. Therefore, a gap may be generated between the receiving portion 1a and the contact surface portion 2a due to variation in the accuracy with which parts are manufactured and variations in assembly operation, so that there is a problem that unnecessary radiation (especially, high-frequency electromagnetic waves) generated by the operation of the electronic apparatus main body leaks to the outside from the gap. To solve this problem, in the related art, a countermeasure in which the contact surface portion 2a is urged to the panel receiving portion 1a by using a spring member is implemented. However, there is a problem that component cost and assembly man-hours increase because an additional component such as the spring member is used.

As shown in FIG. 11A, for example, it is assumed that an external force F1 is applied downward to a front edge of the upper case 2 at the approximate center in the left-right direction. Then, as shown in FIG. 11B, the front frame 1 deforms in a bow shape by the pressing force F1 applied from the upper case to the front frame 1, and largely deforms backward in the approximate center in the left-right direction from the state shown by two-dot chain lines to the state shown by solid lines. When the amount of deformation of the front frame 1 exceeds a predetermined amount, a displacement is generated between the contact surface portion 2a of the upper case 2 and the receiving portion 1a of the front frame 1. Then, the contact surface portion 2a slips from the receiving portion 1a, sinks in front of the front frame 1, and deforms from the state shown by two-dot chain lines to the state shown by solid lines.

In FIG. 11A, for example, it is assumed that an external force F2 is applied backward toward the front frame 1 at the approximate center in the left-right direction. Then, as shown in FIG. 11C, the front frame 1 deforms backward in a bow shape by the pressing force F2, so that a phenomenon in which the front frame 1 deforms from the state shown by two-dot chain lines to the state shown by solid lines in the approximate center in the left-right direction is easily occurs.

FIGS. 12A and 12B illustrate a specific example of the problem shown in FIG. 11C. Reference numeral 3 shown in FIGS. 12A and 12B denotes, for example, a switch device such as a power switch in an electronic apparatus such as a DVD player. The switch device 3 is a tactile switch, and fixed on the front surface of the front frame 1 via a switch board 4. In such a situation, when a force beyond necessity is applied to an operation button of the switch device 3 as an operational force, a deformation occurs in the front frame 1. As a result, as shown in FIG. 12B, the front frame 1 deforms from the state shown by two-dot chain lines to the state shown by solid lines, and the operability of the operation button deteriorates.

SUMMARY OF THE INVENTION

The problem to be solved is that a chassis structure in the related arts is not economical due to additional component cost and assembly man-hours because an additional component such as a spring member is used to prevent unnecessary radiation (especially, high-frequency electromagnetic waves) generated from the electronic apparatus main body from leaking to the outside. Further, another problem to be solved is that the front frame and the upper case are easily deformed when a large external force is applied to the front frame and the upper case.

The chassis structure of an embodiment of the present invention includes a chassis member having a receiving portion and a case member having a contact surface portion mounted on the receiving portion, the contact surface portion not being fixed to the receiving portion but being movably supported by the receiving portion. A positioning portion protruding in a direction intersecting a direction extending along the surface of the contact surface portion is provided in the receiving portion, and the case member is mounted on the chassis member while the top edge of the contact surface portion is in contact with the positioning portion.

The electronic apparatus of an embodiment of the present invention includes a chassis member having a receiving portion, a case member having a contact surface portion mounted on the receiving portion, the contact surface portion not being fixed to the receiving portion but being movably supported by the receiving portion, and an electronic apparatus main body. The electronic apparatus main body is supported by the chassis member, a positioning portion protruding in a direction intersecting a direction extending along the surface of the contact surface portion is provided in the receiving portion, and the case member is mounted on the chassis member while the top edge of the contact surface portion is in contact with the positioning portion.

According to the chassis structure of the embodiment of the present invention, the contact surface portion of the case member is made in contact with the positioning portion of the chassis member, so that it is possible to prevent unnecessary radiation generated from the electronic apparatus main bogy from leaking to the outside from the gap between the receiving portion and the contact surface portion. Further, by making the contact surface portion in contact with the positioning portion, it is possible to receive a force applied to one of the chassis member and the case member by the other member and prevent each member from being deformed by the external force.

According to the electronic apparatus of the embodiment of the present invention, an electronic apparatus including a chassis structure having a large strength can be provided even when thinning the plate thickness of the chassis member and the case member.

BRIEF DESCRIPTION OF THE DRAWINGS

FIG. 8 is views explaining a first embodiment of the chassis structure according to an embodiment of the present invention.

FIG. 9 is views explaining the first embodiment of the chassis structure according to an embodiment of the present invention.

FIG. 100 is a right side view;

FIG. 11 is views explaining a chassis structure in the related art, FIG. 12 is views explaining a chassis structure in the related art.

DESCRIPTION OF THE PREFERRED EMBODIMENTS

A positioning portion is provided to a chassis member having a receiving portion, an edge of a contact surface portion of a case member mounted on the chassis member is made in contact with the positioning portion, and in this state, the case member is mounted on the chassis member. In this way, an external force applied to the chassis member or the case member is received by the two members together, so that the external force applied to one member can be reduced. Therefore, a chassis structure which can be lightened by thinning the plate thickness of the chassis member and the case member and can increase strength of entire structure, and an electronic apparatus including the chassis structure are realized by a simple configuration.

[Embodiment 1]

Figure 1:
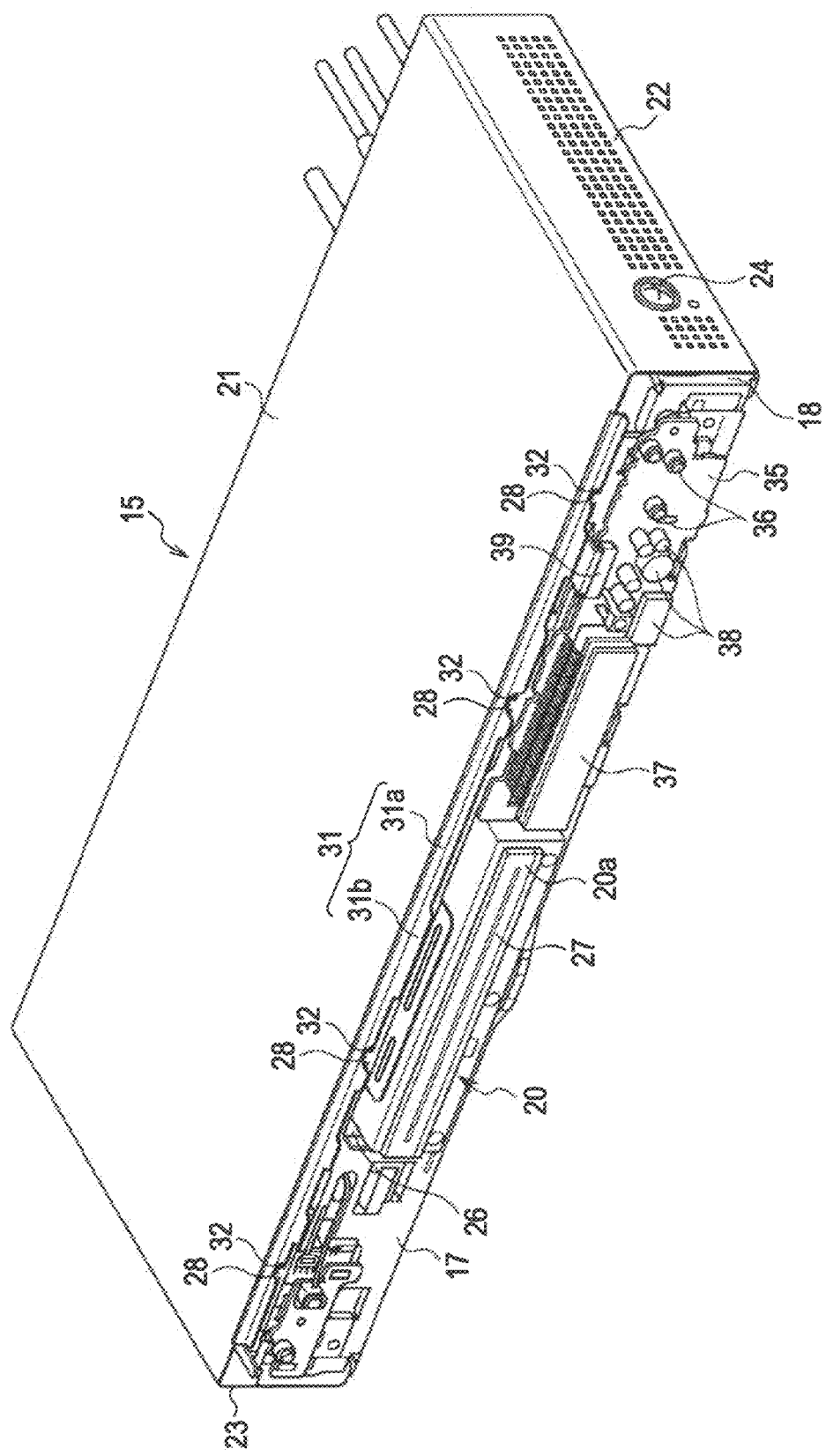
FIG. 1 shows a DVD player showing a first embodiment of an electronic apparatus using a chassis structure according to an embodiment of the present invention, and is a perspective view of the DVD player from which a front panel is removed.
Figure 2:
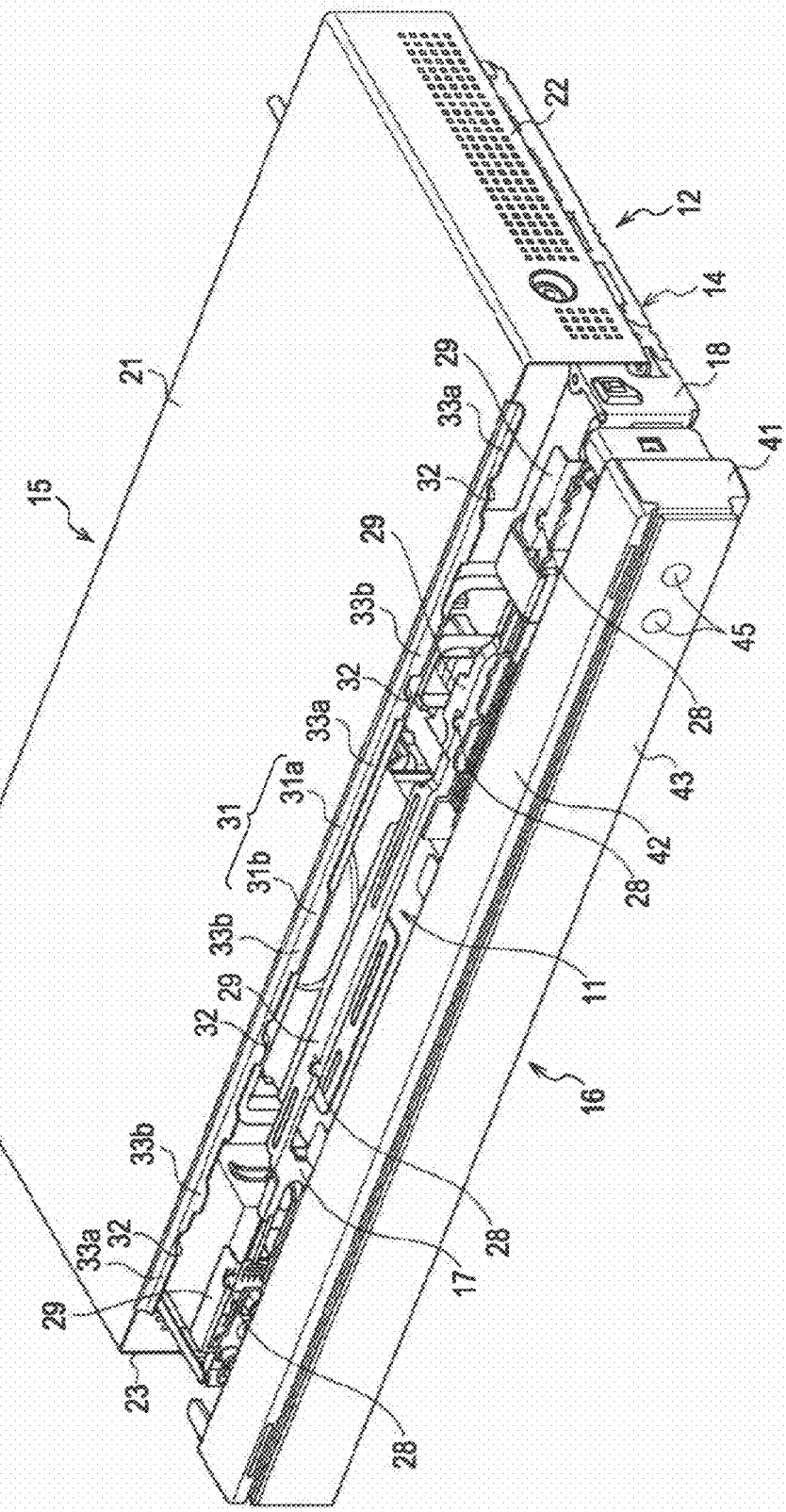
FIG. 2 shows the DVD player showing the first embodiment of the electronic apparatus using the chassis structure according to an embodiment of the present invention, and is a perspective view of the DVD player from which the front panel and an upper case are separated.
Figure 3:
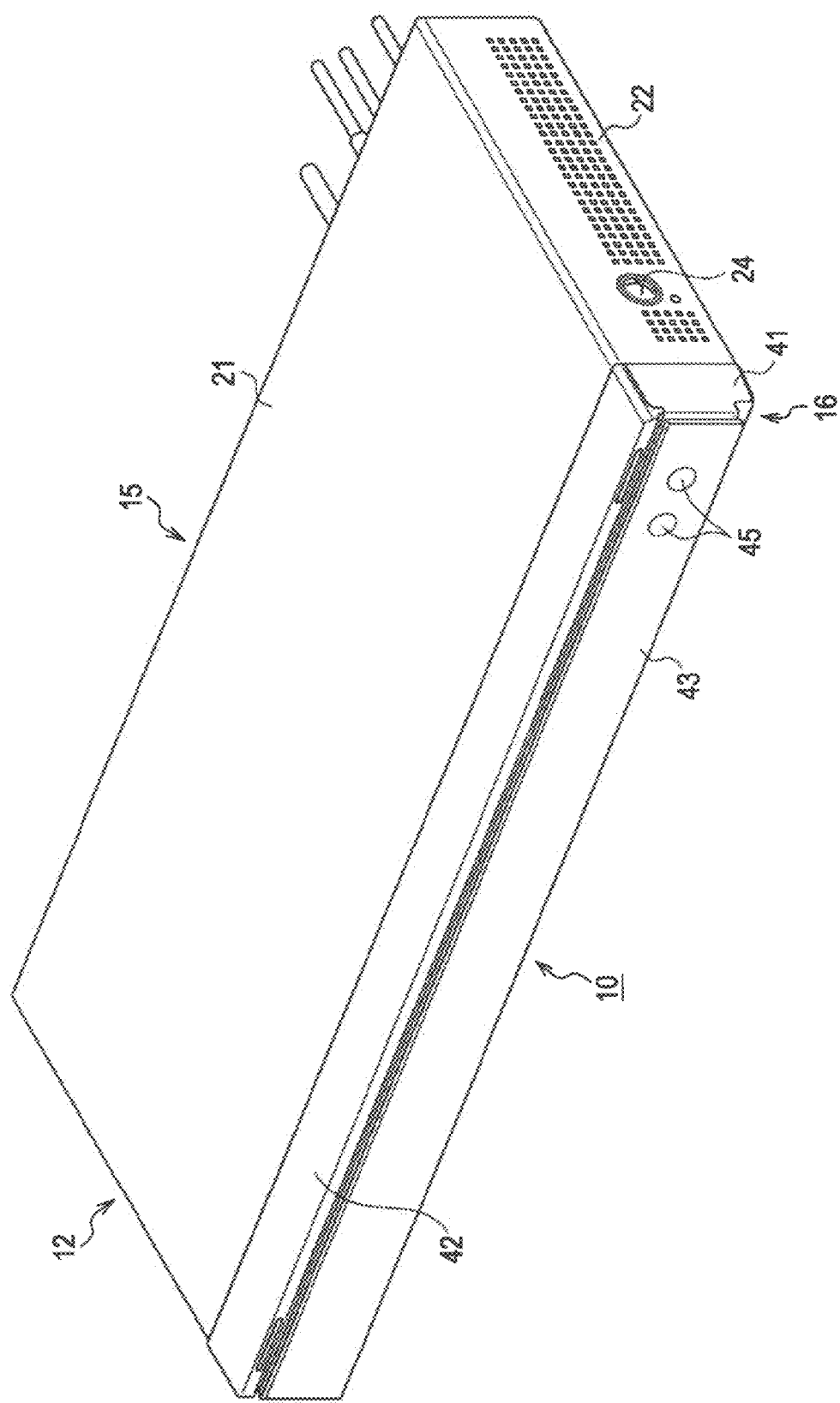
FIG. 3 is an external perspective view of the DVD player showing the first embodiment of the electronic apparatus using the chassis structure according to an embodiment of the present invention.

FIGS. 1 to 3 shows an example of a first embodiment of an electronic apparatus including a chassis structure according to an embodiment of the present invention, and the chassis structure is applied to a DVD (Digital Versatile Disc) recorder as the electronic apparatus. The DVD recorder 10 includes an electronic apparatus main body 11 which uses a DVD as an information recording medium and performs recording/reproducing of an information signal, and a housing 12 which accommodates and protects the electronic apparatus main body 11 inside the housing 12. FIG. 3 is an external perspective view of the DVD recorder 10 as viewed from the front upper right.

Although the electronic apparatus main body 11 will not be described in detail, the electronic apparatus main body 11 has a similar structure to electronic apparatuses generally provided in the market, and includes a disk drive apparatus 20, a loading apparatus, and a control apparatus controlling them, and the like. The disk drive apparatus 20 includes a turntable, a spindle motor, an optical pickup, a pickup drive section, and the like. An optical disk is attachably/detachably attached to the turntable, and the turntable is driven to rotate by the spindle motor. The optical pickup is configured to be able to reciprocate in the radius direction of the optical disk by the pickup drive section. When the optical pickup moves from the inside of the optical disk to the outside of the optical disk in the radius direction, the optical pickup performs recording/reproducing of the information signal to/from the optical disk.

The housing 12 accommodating the electronic apparatus 11 having a configuration as described above has a configuration as shown in FIG. 2 or the like. Specifically, the housing 12 includes a main chassis 14 representing a specific example of the chassis member and an upper case 15 representing a specific example of the case member. The main chassis 14 constitutes a main frame on which the electronic apparatus main body 11 is mounted, and for example, is constituted by electrogalvanized steel plates (SECC) or the like.

The main chassis 14 includes a bottom frame having a generally rectangular shape on which the electronic apparatus main body 11 is mounted, a front frame 17, a rear frame, and left and right side frames 18. The front frame 17, the rear frame, and left and right side frames 18 are formed integrally with the bottom frame continuously from the four sides of the bottom frame. The electronic apparatus main body 11 mounted on the bottom frame is detachably fixed by a plurality of fixing screws (not shown in the figures). The four frames other than the bottom frame are formed by folding the four frames by 90 degrees to raise the four frames so that the four frames surround the surface of the bottom frame in a rectangular shape. A rectangular opening opened upward by being surrounded by the four frames is covered by the upper case 15.

The upper case 15 includes an upper plate 21 having a rectangular shape and side plates 22, 23 extended from the left and right sides of the upper plate 21, and is formed into a squared U-shape as a whole by using a material such as SECC. The upper plate 21 has a size which can cover the entire upper surface of the main chassis 14, and is formed to have a length in the depth direction (depth length) slightly larger than the depth length of the main chassis 14. The left and right side plates 22, 23 are integrally formed with the upper case 15 by being extended from the two opposing sides of the upper case 15. The left and right side plates 22, 23 are formed by folding both side portions of the upper plate 21 in the longitudinal direction by 90 degrees to one surface side.

When the upper case 15 is attached to the main chassis 14, the left and right side plates 22, 23 face and overlap the outside of the left and right side frames 18. The front frame 17 of the main chassis 14 is fitted into an open portion in the front side of the upper case 15, and the rear frame of the main chassis 14 is fitted into an open portion the rear side of the upper case 15. The upper case 15 can be mounted/removed on/from the main chassis 15 by fixing the upper case 15 to the main chassis 14 using screws at a plurality of positions. In this embodiment, the upper case 15 is fixed by fixing screws 24 at a total of three positions, which are a position on the left side plates 22, a position on the right side plate 23, and a position of a protrusion portion (not shown in the figures) that protrudes from the rear edge of the upper plate 21 to the rear frame (also a configuration is possible in which protrusions are provided at two or more positions and the upper case 15 is fixed at a total of four or more positions).

As shown in FIGS. 1 to 7, the front frame 17 of the main chassis 14 is formed so as to be slightly smaller than the front side opening of the upper case 15, and a gap is provided at both left and right sides. A horizontally long opening 26 is provided at a position slightly shifted from the center to the left in the front frame 17. The disk drive apparatus 20 is arranged so that the front portion of the disk drive apparatus 20 protrudes slightly from the horizontally long opening 26 of the front frame 17. A slit-like disk inlet/outlet 27 to/from which an optical disk is inserted/removed is provided in the front portion 20a of the disk drive apparatus 20.

Further, stopper pieces 28 representing a first specific example of the positioning portion are provided on the upper edge of the front frame 17 at a plurality of positions (four positions in this embodiment) at the same height position in the same shape and size. The stopper piece 28 performs positioning between the main chassis 14 and the upper case 15 in the depth direction. The four stopper pieces 28 are arranged at a total of four positions, which are two positions near respective side edges of the front frame 17 and two positions which are arranged inside the side edges with an appropriate gap therebetween, and the four stopper pieces 28 protrude upward by an appropriate length. The height (amount of protrusion) of the stopper pieces 28 is preferably set to be between the same value as the plate thickness of the upper frame 15 (one times the plate thickness) and a value of two times the plate thickness.

Figure 6:
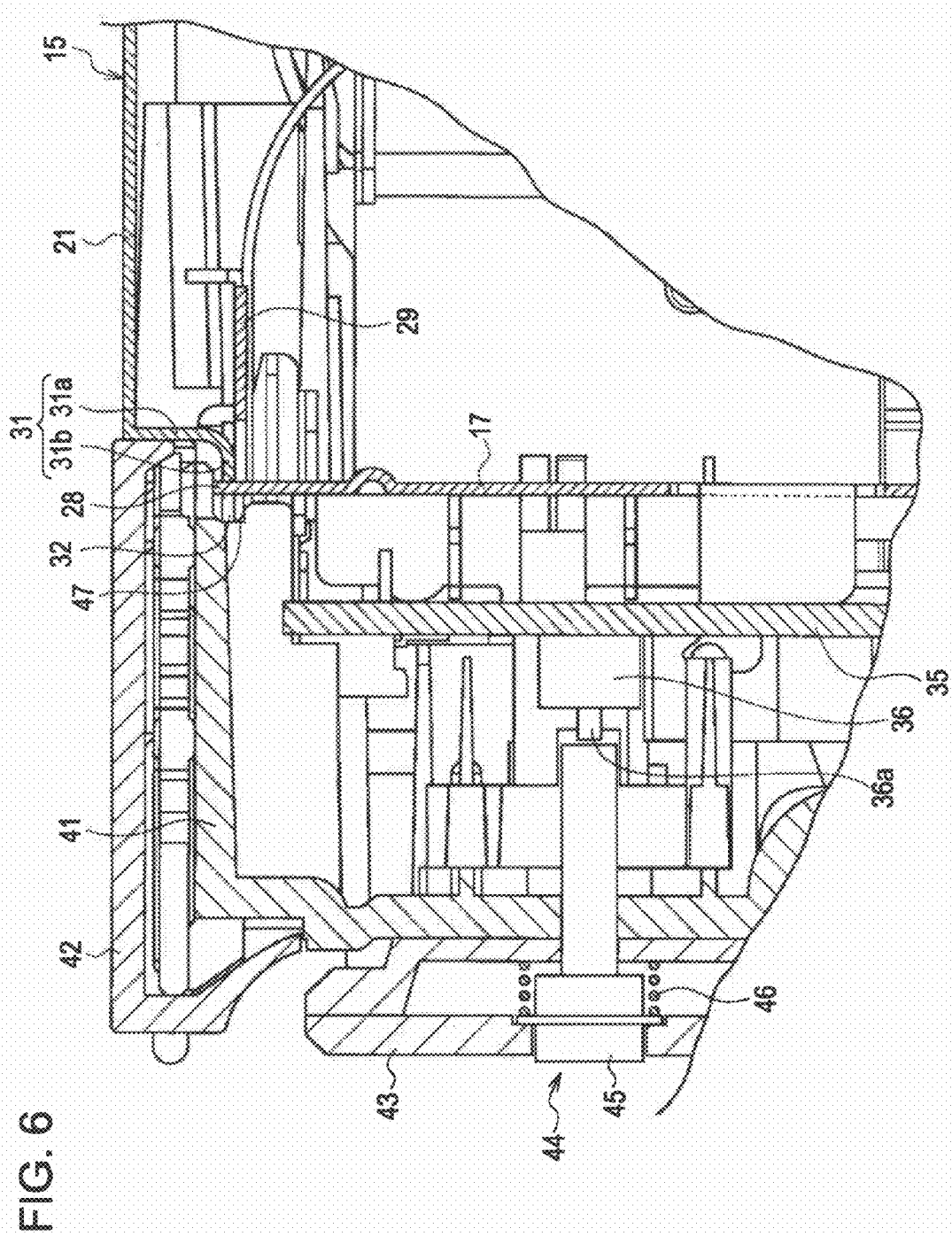
FIG. 6 is an illustration showing an important part of FIG. 4 by cross-sectioning the part in front-back direction.
Figure 7:
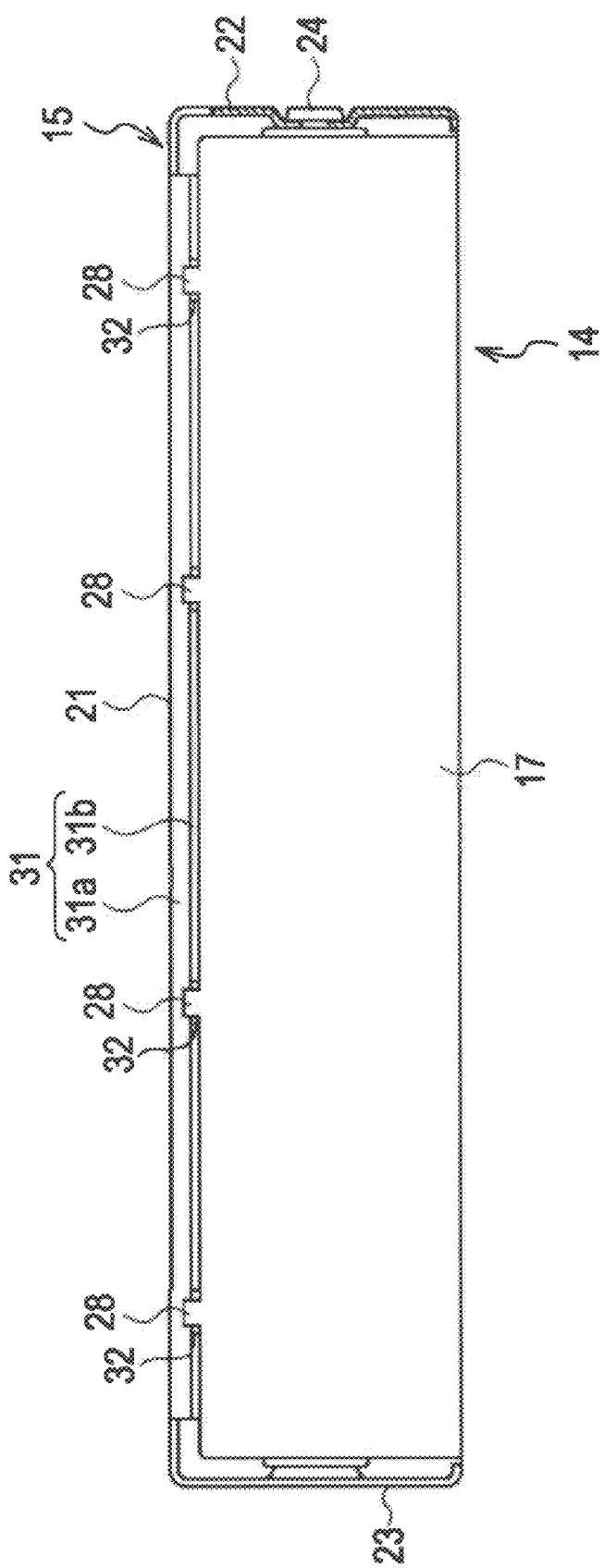
FIG. 7 is an illustration explaining an assembled state of the chassis member and the case member of the electronic apparatus using the chassis structure according to an embodiment of the present invention.

When the stopper pieces 28 are set to such a size, as shown in FIG. 6, the stopper pieces 28 can be easily accommodated inside the front panel 16. In this way, in a state in which the front panel 16 is mounted, it is possible to eliminate a risk that the stopper pieces 28 are exposed to the outside and deteriorate the appearance. The embodiment of the present invention can be achieved by using only one stopper piece 28. Therefore, the number of the stopper pieces 28 may be one or more and three or less, and further, five or more stopper pieces 28 may be provided.

Figure 5:
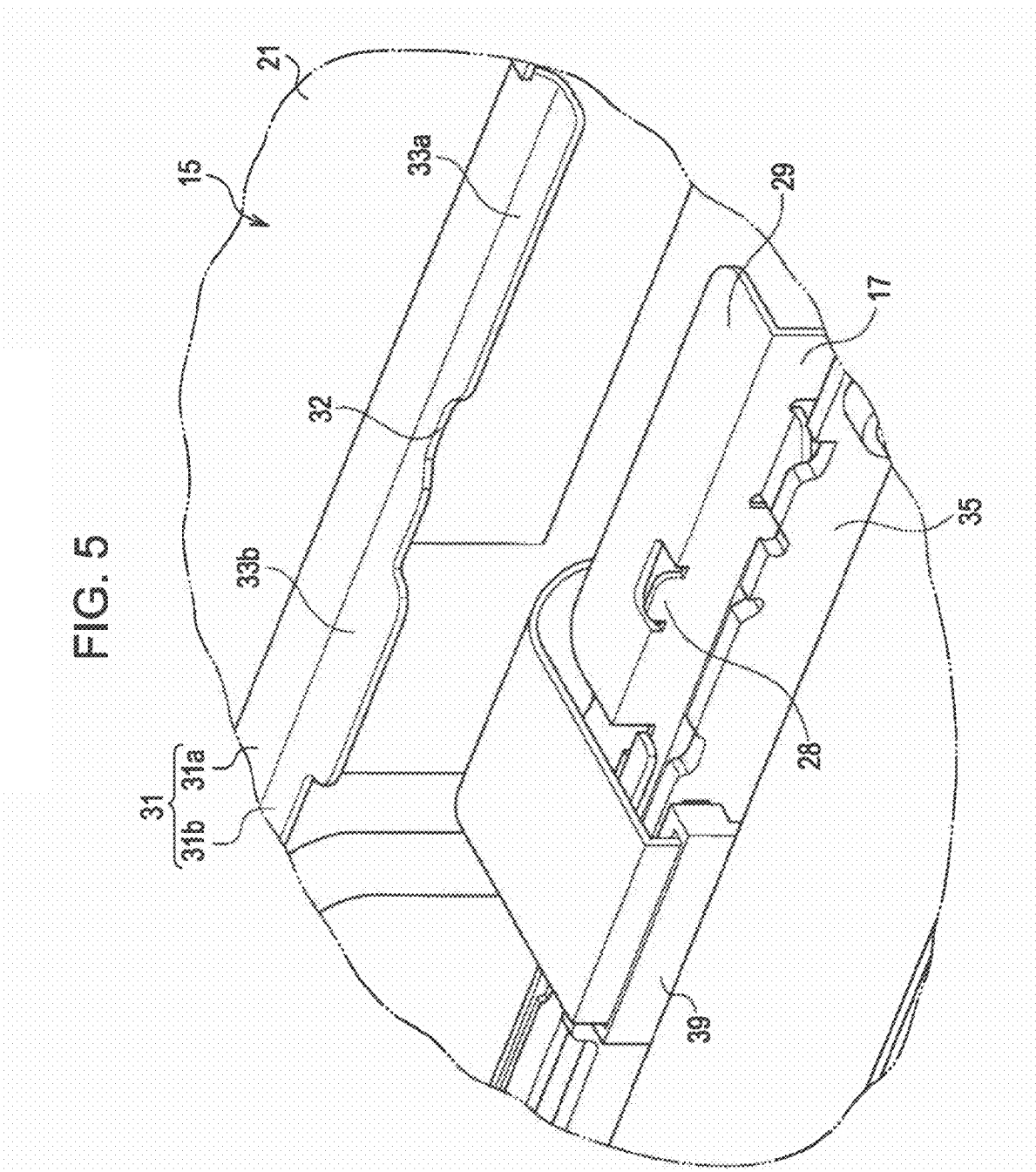
FIG. 5 is a further enlarged illustration showing an important part of FIG. 4.

As shown in FIG. 5 or the like, for example, each of the stopper pieces 28 can be formed as described below. First, a squared U-shaped portion around the stopper piece 28 is cut out from the upper edge of the front frame 17 while the stopper piece 28 remains. Next, the upper portion higher than the base portion of the stopper piece 28 is folded by 90 degrees while the stopper piece 28 is not folded. In this way, the stopper piece 28 can be formed by being cut and raised, and at the same time, a support receiving surface 29 representing a specific example of the receiving portion for supporting the contact surface portion of the upper case 15 can be formed around (near) the stopper piece 28.

Other than this embodiment, the positioning portion illustrated as the stopper piece 28 may be provided by a configuration in which, for example, an axle pin or a convex piece is fixed to the front panel by welding or the like as the positioning portion. Further, by performing a bending work on the upper edge of the front panel to form a protrusion, the protrusion can be used as the positioning portion. Furthermore, by performing a pressing work on the upper edge of the front panel to form a boss portion, the boss portion can be used as the positioning portion. In addition, in this embodiment, although the four stopper pieces 28 are formed into the same shape and the same size, of course, a combination of different shapes and different sizes are possible.

Portions of the upper case 15 which are made in contact with the four stopper pieces 28 of the front frame 17 do not have to be concave portions described below, but may be the edge portion of the upper case 15. Although the edge portion of the upper case 15 is, generally, only a section forming an edge, it is possible to provide a protrusion portion integrally with the edge section, or provide a protrusion portion by integrally welding another member, to make a configuration in which fitting reliability to the stopper piece 28 is improved.

The receiving portion illustrated as the support receiving surface 29 performs positioning of the upper case 15 with respect to the main chassis 14 in the height direction. In addition to the configuration illustrated in this embodiment, the receiving portion may be provided by a configuration in which, for example, an axle pin or a convex piece is fixed to the front panel by welding or the like as the receiving portion. Further, by performing a bending work on the upper edge of the front panel to form a protrusion, the protrusion can be used as the receiving portion, and also by performing a pressing work on the upper edge of the front panel to form a boss portion, the boss portion can be used as the receiving portion. The receiving portion is not limited to a flat portion having an appropriate area, but may be a portion for supporting the upper case by a point contact of a round bar or a point contact of a spherical body.

As shown in FIGS. 2 to 7, in this embodiment, four concave portions 32 corresponding to the four stopper pieces 28 of the front frame 17 are provided on the front edge of the upper plate 21 of the upper case 15. The concave portion 32 performs positioning of the upper case 15 with respect to the front frame 17 in the width direction (left-right direction), and the positioning function can be performed by at least one concave portion. However, in this embodiment, four concave portions 32 are provided at four positions to correspond to the four stopper pieces 28, and each concave portion 32 is fitted into corresponding stopper piece 28. In this case, the width of the bottom portion of the concave portion 32 of the upper case 15 and the width of the stopper piece 28 is set to lengths in which the concave portion 32 and the stopper piece 28 are fitted into each other. In this way, the positioning between the main chassis 14 and the upper case 15 in the depth direction can be performed, and at the same time, the positioning of the upper case 15 with respect to the main chassis 14 in the width direction can be performed. By providing fitting portions between the stopper piece 28 and the concave portion 32 at four positions, the fitting relation between the upper case 15 and the main chassis 14 can be more reliable.

Figure 4:
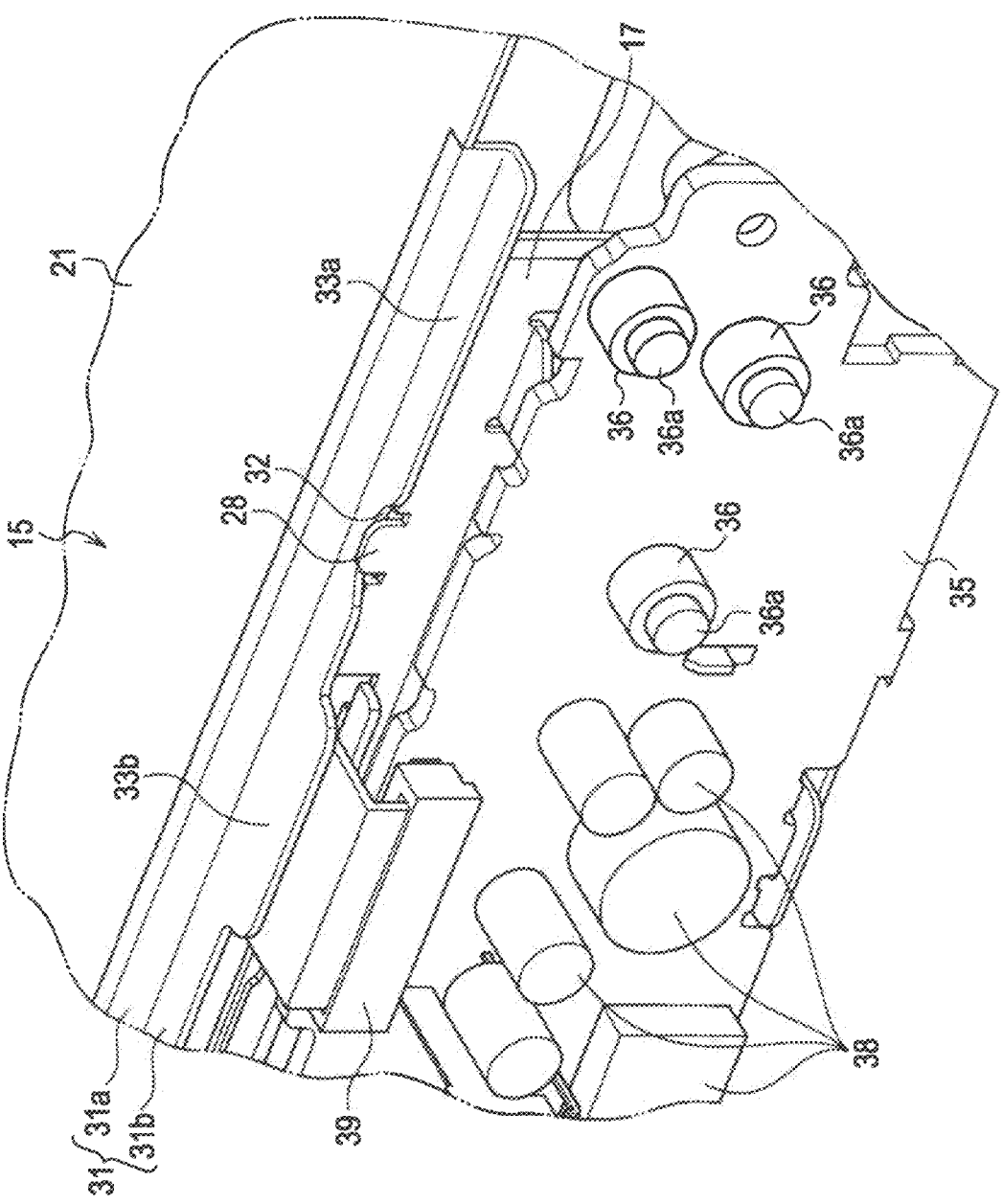
FIG. 4 is an enlarged illustration showing an important part of FIG. 1.

As shown in FIGS. 4 and 5 in an enlarged manner, the contact surface portion 31 is formed to have an L-shape of a cross section in the direction crossing the longitudinal direction. In other words, the contact surface portion 31 includes a vertical surface portion 31*a* falling downward continuously from the upper plate 21 and a horizontal surface portion 31*b* provided continuously from the bottom edge of the vertical surface portion 31*a* in parallel with the upper plate 21. The vertical surface portion 31*a* is constituted by a flat surface portion formed by the portion falling downward in the front side which is continuously extended in the longitudinal width direction, and formed by folding the portion continued from the front edge of the upper plate 21 by 90 degrees. The horizontal surface portion 31*b* is formed by folding back a portion continued from the bottom edge of the vertical surface portion 31*a* by 90 degrees, and extending the portion in the direction parallel to the upper plate 21.

The horizontal surface portion 31*b* of the contact surface portion 31 includes narrow width portions 33*a* for increasing strength and wide width portions 33*b* for fitting and holding the front panel 16. The wide width portions 33*b* are arranged at a plurality of positions in the longitudinal direction of the horizontal surface portion 31*b* (arranged at preferred positions for supporting the front panel 16). In the narrow width portions 33*a* and the wide width portions 33*b*, the concave portions 32 are provided at four positions corresponding to the four stopper pieces 28 of the front frame 17.

Each bottom portion (edge in the depth) of the four concave portions 32 is set at the same position in the front-back direction. This is because the four stopper pieces 28 of the front frame 17 are also set at the same position in the front-back direction. Therefore, when a plurality of stopper pieces are set in different positions in the front-back direction, a plurality of concave portions are set in different positions in the front-back direction accordingly.

As shown in FIGS. 4 to 6, a switch board 35 is attached to the front surface of the front frame 17. A plurality of switch devices 36, a display apparatus 37 such as a liquid crystal panel, electronic components 38 such as a microcomputer, integrated circuit (LSI), capacitor, and resistor, a connector 39, and the like are attached to the front surface of the switch board 35. As the switch device 36, for example, a power switch for turning on/off the power, a record reproducing switch for selecting a start and an end of recording and reproducing of information, and the like are used. The front panel 16 is attachably/detachably attached to the front frame 17 as the front panel 16 covers over the front frame 17.

The front panel 16 includes a housing 41 covering the front portion of the front frame 17, a top cover 42 attached to the upper portion of the housing 41, and a front cover 43 attached to the front surface of the housing 41. The housing 41 is constituted by an elongated container body having a generally rectangular solid shape having an opening in the rear surface, and the switch board 35 and other members are accommodated in the housing 41 from the rear surface. The top cover 42 is attached to the top surface of the housing 41 and front cover 43 is attached to the front surface of the housing 41.

In a state in which the front panel 16 is attached to the front frame 17, in the front cover 43, an operation section 44 for operating the switch device 36 is provided at a position corresponding to the switch device 36 fixed to the switch board 35. The operation section 44 includes a button valve 45 in which the shaft diameter of one end in the shaft direction is enlarged, and a coil spring 46 which urges the button valve 45 in the direction for detaching the button valve 45 from the switch device 36. The button valve 45 is supported movably in the shaft direction for a predetermined length by the front caver 43, the enlarged end of the button valve 45 is exposed on the surface of the front cover 43, and the other end protrudes backward through the front cover 43. The back end of the button valve 45 is approached by an operation element 36*a* of the switch device 36.

As shown in FIG. 6, an accommodating concave portion 47 which can accommodate the stopper piece 28 fitted into the concave portion 32 of the horizontal surface portion 31b is provided at the edge portion of the top cover 42 of the opening of the housing 41. Since the accommodating concave portion 47 is provided in the housing 41, it is possible to hide a state in which the stopper piece 28 and the concave portion 32 are fitted to each other in the housing 41, eliminate messiness, and make the appearance around the front panel 16 clear and beautiful.

After the electronic apparatus main body 11 is mounted on the main chassis 14 having the configuration as described above, the upper case 15 is attached to the main chassis 14, and fixed to the main chassis 14 by the fixing screws 24 at three or more predetermined positions. In this way, the upper case 15 is positioned with respect to the main chassis 14 at a predetermined position, and fixed. At this time, as shown in FIGS. 1, 4, 6, and 7, the contact surface portion 31 of the upper case 15 is mounted on the support receiving surface 29 provided in the front frame 17, so that the positioning of the upper case 15 with respect to the front frame 17 in the height direction is performed. At the same time, the concave portion 32 provided in the contact surface portion 31 of the upper case 15 is fitted with the stopper piece 28 provided on the front frame 17, so that the positioning between the front frame 17 and the upper case 15 in the depth direction is performed.

Figure 8A:
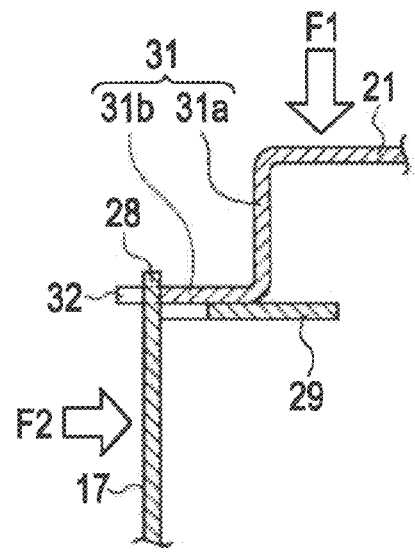
FIG. 8A is a cross-sectional view of a first part and FIG. 8B is a plan view of the first part.
Figure 8B:
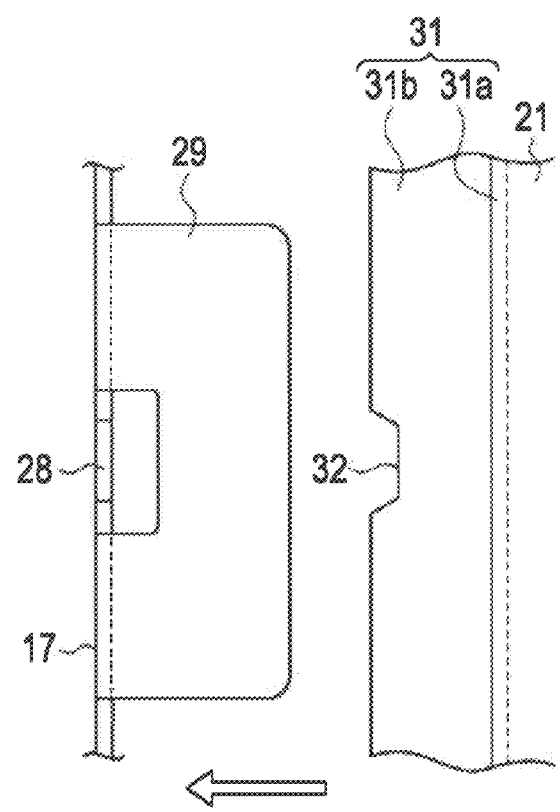
Figure 9A:
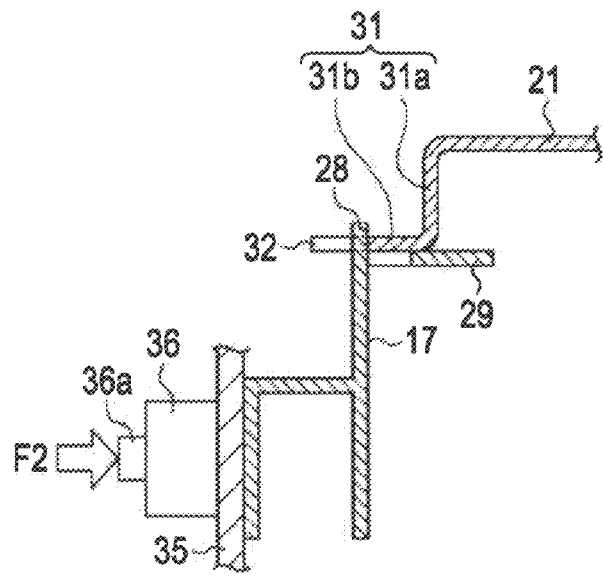
FIG. 9A is a cross-sectional view of a second part and FIG. 9B is a plan view of the second part.
Figure 9B:
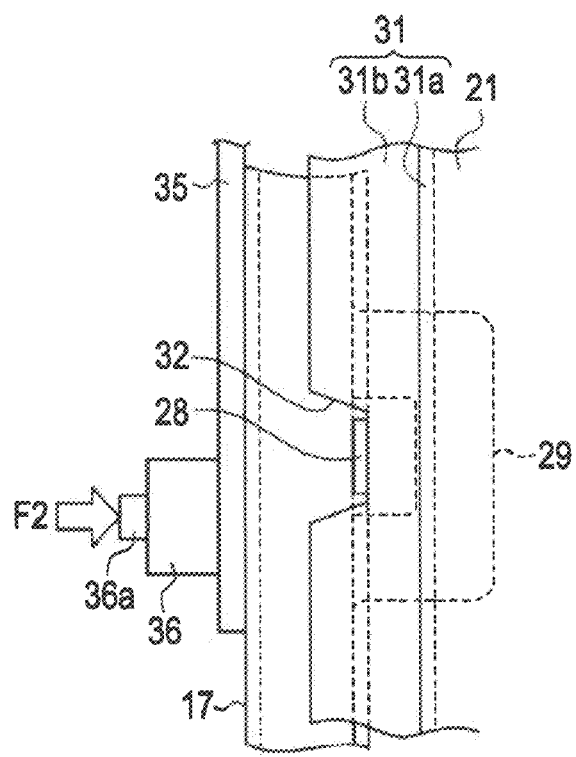

FIGS. 8A and 9A show positioning relationships between the stopper piece 28 of the front frame 17 and the contact surface portion 31 of the upper case 15 in cross-sectional views. At this time, the left and right side plates 22, 23 of the upper case 15 and the rear portion are fixed to the front frame 17 by the fixing screws 24. On the other hand, only the contact surface portion 31 which is the front edge portion of the upper plate 21 is not fixed by a fixing screw from the viewpoint of aesthetic appearance, and the concave portion 32 of the contact surface portion 31 is fitted with the stopper piece 28 of the front frame 17.

In this case, since the depth of the upper case 15 is set larger than the depth of the main chassis 14, the fitting between the stopper piece 28 of the front frame 17 and the concave portion 32 of the upper case 15 can be more reliable. At this time, since the upper case 15 is fixed to the rear frame by a fixing screw (not shown in the figures), positions of the stopper piece 28 and the concave portion 32 in the depth direction are set in advance so that the fitting is possible with reference to the fixed point in the rear frame. Based on this, when the upper case 15 is attached to the main chassis 14 and fixed by the screw at the fixed point, the concave portion 32 is pressed to the stopper piece 28 due to the difference of the positions in the depth direction. Therefore, the concave portion 32 and the stopper piece 28 can be fitted to each other more reliably. The difference of the positions in the depth direction is absorbed by a bending deformation of the rear frame.

Figure 11A:
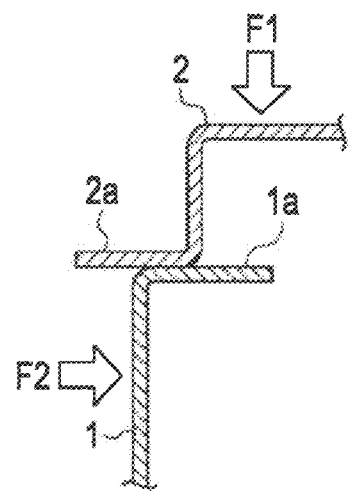
FIG. 11A is a cross-sectional view explaining a state before deformation.
Figure 11B:
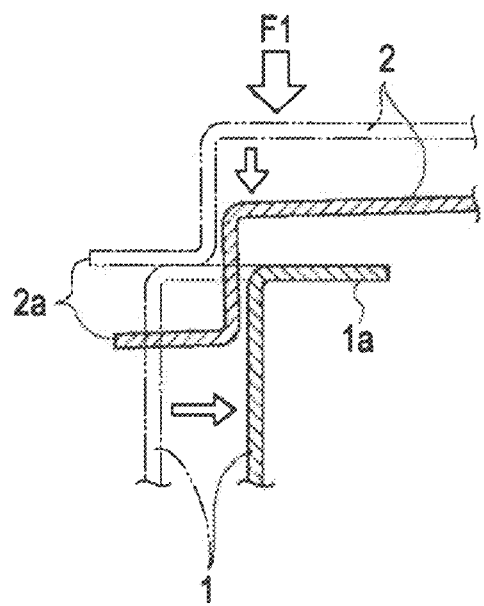
FIG. 11B is a cross-sectional view explaining a state in which a front frame deforms backward and an upper case deforms downward.

Based on this, as shown in FIG. 8A, when a downward external force F1 is applied to the front edge portion of the upper plate 21 of the upper case 15, a frontward reaction force is generated on the contact surface portion 31 by reaction forces from both left and right sides and the rear. In this way, the concave portion 32 of the contact surface portion 31 is pressed to the rear of the stopper piece 28, and received by the stopper piece 28. The shape of the contact surface portion 31 is maintained by a reaction force applied from the stopper piece 28, so that it is possible to prevent the upper case 15 and the front frame 17 from deforming into a shape as shown in FIG. 11B, which is shown as a problem in the related art.

Figure 11C:
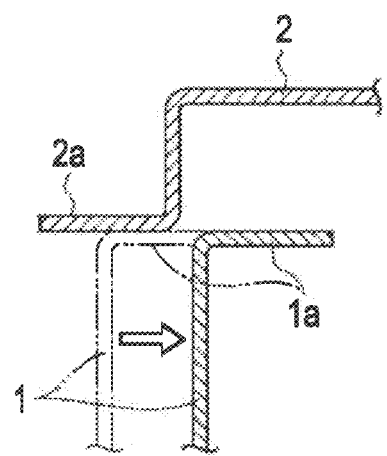
FIG. 11C is a cross-sectional view explaining a state in which the front frame deforms backward.
Figure 12A:
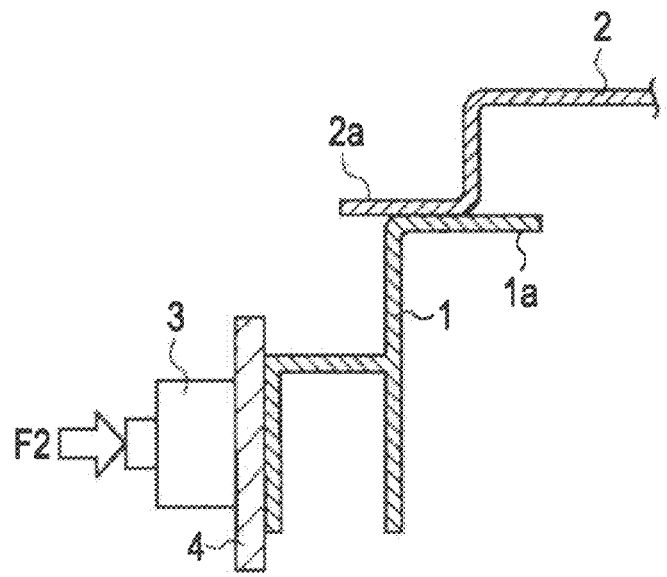
FIG. 12A is a cross-sectional view explaining a state before deformation.
Figure 12B:
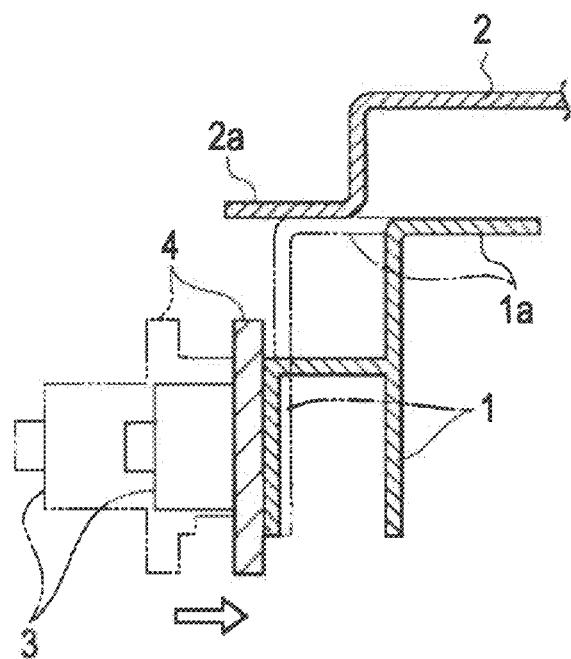
FIG. 12B is a cross-sectional view explaining a state after deformation.

As shown in FIG. 8A, when a backward external force F2 is applied to the upper edge portion of the front frame 17, the stopper piece is pressed to the concave portion 32 of the contact surface portion 31. At this time, the left and right side plates 22, 23 of the upper case 15 and the rear portion are fixed to the front frame 17 by the fixing screws 24. Therefore, the shape of the front frame 17 is maintained by reaction forces from the points fixed by the fixing screws 24, so that it is possible to prevent the front frame 17 from deforming into a shape as shown in FIG. 11C, which is shown as a problem in the related art.

Further, as shown in FIG. 9A, it is assumed that a large pressing force is applied to the operation element 36a of the switch device 36, and the pressing force is applied to the upper edge portion of the front frame 17 via the switch board 35 as a backward external force F2. Then, the stopper piece 28 is pressed to the concave portion 32 of the contact surface portion 31, so that the shape of the front frame 17 is maintained by reaction forces from the points fixed by the screws. Therefore, also in this embodiment, it is possible to prevent the front frame 17 from deforming into the shape as shown in FIG. 11C, which is a problem in the related art.

[Embodiment 2]

Figure 10A:
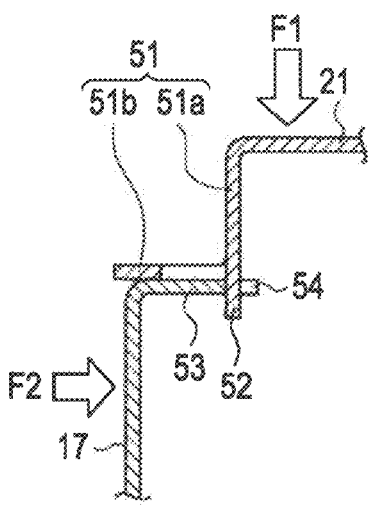
FIG. 10A is a cross-sectional view.
Figure 10B:
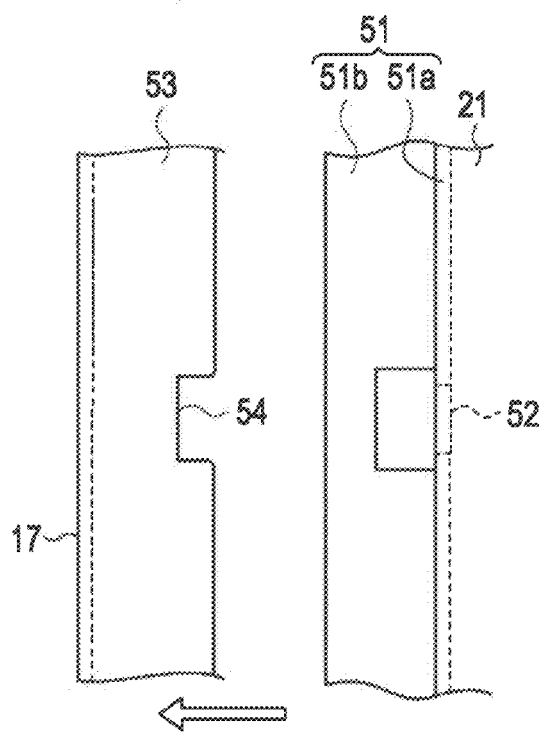
FIG. 10B is a separated plan view.

FIG. 10 shows a second embodiment of the present invention, in which a stopper piece 52 as a positioning portion is provided on a contact surface portion 51 of the upper case 15, and a concave portion 54 corresponding to the stopper piece 52 is provided in a support receiving surface 53 as a receiving portion of the front frame 17. The contact surface portion 51 of the upper case 15 includes a vertical surface portion 51a falling downward continuously from the upper plate 21 and a horizontal surface portion 51b provided continuously from the bottom edge of the vertical surface portion 51a in parallel with the upper plate 21. The vertical surface portion 51a is constituted by a flat surface portion formed by the portion falling downward in the front side which is continuously extended in the longitudinal width direction, and formed by folding the portion continued from the front edge of the upper plate 21 by 90 degrees. The horizontal surface portion 51b is formed by folding back a portion continued from the bottom edge of the vertical surface portion 51a by 90 degrees, and extending the portion in the direction parallel to the upper plate 21.

The stopper piece 52 as a positioning portion is provided on the bottom edge of the vertical surface portion 51a of the contact surface portion 51. In the same way as the stopper piece 28, the stopper piece 52 performs positioning between the main chassis 14 and the upper case 15 in the depth direction. In the same way as the stopper piece 28, the stopper piece 52 is formed by cutting out a squared U-shaped portion surrounding the stopper piece 52, and folding the horizontal surface portion 51b by 90 degrees at the base portion of the stopper piece 52. In the same way as the embodiment describe above, of course, various modifications can be applied to the stopper piece 52 regarding shape, configuration, and the like.

The support receiving surface 53 as a receiving portion is provided by folding the upper edge portion of the front frame 17. The concave portion 54 is provided in the outer edge of the support receiving surface 53. In the same way as the embodiment describe above, of course, various modifications can be applied to the support receiving surface 53 and the concave portion 54 regarding shape, configuration, and the like.

By employing such a configuration, the same effect as that of the embodiment describe above can be obtained. Specifically, the contact surface portion 51 of the upper plate 21 is mounted on the support receiving surface 53 provided in the front frame 17, so that the positioning of the upper case 15 with respect to the front frame 17 in the height direction is performed. At the same time, the stopper piece 52 provided on the contact surface portion 51 of the upper case 21 is fitted into the concave portion 54 provided in the front frame 17, so that the positioning between the front frame 17 and the upper case 15 in the depth direction is performed.

Figure 10C:
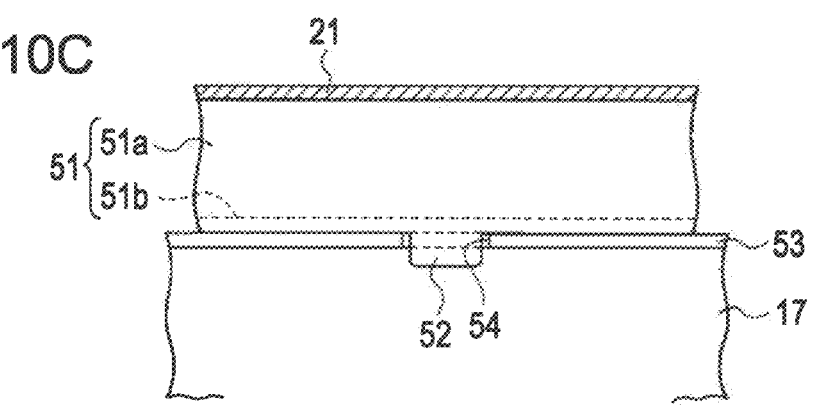
FIG. 10 is views explaining a second embodiment of the chassis structure according to an embodiment of the present invention.

FIGS. 10A and 10C show positioning relationships between the support receiving surface 53 of the front frame 17 and, the contact surface portion 51 and the stopper piece 52 of the upper case 15 in cross-sectional views. At this time, the left and right side plates 22, 23 of the upper case 15 and the rear portion are fixed to the front frame 17 by the fixing screws 24. On the other hand, only the contact surface portion 51 which is the front edge portion of the upper plate 21 is not fixed by a fixing screw from the viewpoint of aesthetic appearance, and the stopper piece 52 of the contact surface portion 51 is fitted into the concave portion 54 of the front frame 17.

In this state, as shown in FIG. 10A, when a downward external force F1 is applied to the front edge portion of the upper plate 21 of the upper case 15, a frontward reaction force is generated on the contact surface portion 51 by reaction forces from both left and right sides and the rear. In this way, the stopper piece 52 of the contact surface portion 51 is pressed to the rear of the concave portion 54, and received by the concave portion 54. The shape of the contact surface portion 51 is maintained by a reaction force applied from the concave portion 54, so that it is possible to prevent the upper case 15 and the front frame 17 from deforming into a shape as shown in FIG. 11B, which is shown as a problem in the related art.

As shown in FIG. 10A, when a backward external force F2 is applied to the upper edge portion of the front frame 17, the concave portion 54 provided in the support receiving surface 53 is pressed to the stopper piece 52 provided on the contact surface portion 51. At this time, the left and right side plates 22, 23 of the upper case 15 and the rear portion are fixed to the front frame 17 by the fixing screws 24. Therefore, the shape of the front frame 17 is maintained by reaction forces from the points fixed by the fixing screws 24, so that it is possible to prevent the front frame 17 from deforming into a shape as shown in FIG. 11C, which is shown as a problem in the related art.

As described above, in the related art, a structure in which the front edge portion of the upper case is simply mounted on the front frame or the front portion of the main chassis is generally employed. Therefore, there is a problem that the upper case, the front frame, and the like are easily deformed when an external force is applied to the front edge portion of the upper case, the front frame, or the like.

On the other hand, the embodiments of the present invention employ a structure in which partially protruded shapes (one or more protruded shapes) are formed by bended portions in the front frame, and a part of the upper case is positively pressed against the protruded shapes. In this way, the following can be realized: (1) countermeasure against unnecessary radiation, (2) improvement of the strength of the outer covering, (3) improvement of operability of the buttons, and the like.

(1) Countermeasure Against Unnecessary Radiation

In the related art, there may be a gap between the front frame and the upper case due to variation of components, variation of assembly accuracy, and the like. In such a case, unnecessary radiation generated from the electronic apparatus main body may leak to the outside of the housing from the gap. As a countermeasure to this, in the related art, another component such as a spring is additionally provided to suppress the unnecessary radiation (for example, electromagnetic waves), so that there is a problem that the countermeasure causes an increase of the cost.

On the other hand, by applying a configuration of an embodiment of the present invention, an area in which the front frame and the upper case positively contact with each other increases, so that it is possible to suppress the leakage of the unnecessary radiation. Furthermore, in the embodiments of the present invention, a component such as a spring is not additionally used, and hence a countermeasure can be effectively implemented without increasing the cost.

(2) Improvement of the Strength of the Outer Covering

Generally, when thinning the plate thickness of the upper case, the main chassis, and the front frame to reduce cost, the upper case and the front frame may largely deform due to a downward external force.

On the other hand, by using a configuration of an embodiment of the present invention, even when thinning the plate thickness of the materials, the external force is received by a plurality of members fitting with each other, so that it is possible to effectively suppress the deformation of the upper case, the front frame, and the like.

(3) Improvement of Operability of the Buttons

In an apparatus in which a switch board on which a push button type tactile switch is fixed is fixed on the front surface of the front frame, there are disadvantages described below. For example, when an excessive force is applied to the button, the front frame bends backward by the force applied to the button, so that there is caused a problem that the operability of the button deteriorates. This phenomenon is especially noticeable when the plate thickness of the front frame is small.

On the other hand, when using a configuration of an embodiment of the present invention, the upper case (or the front frame) functions as a stopper of the front frame (or the upper case). Because of this, even when thinning the plate thickness of the front frame, it is possible to prevent or suppress that the front frame is bent by a button operating force, so that the deterioration of the button operability can be prevented.

As described above, according to the embodiments of the present invention, a chassis structure for effectively suppressing unnecessary radiation can be provided. In a trend that the plate thickness of the materials is decreased in order to reduce the cost of components, the embodiments of the present invention can have great advantages in the strength of the outer covering which has disadvantages when the plate thickness is reduced, and the improvement of the button operability.

The present invention is not limited to the embodiments described above and shown by the drawings, and various modifications may be made without departing from the scope of the invention. In the above embodiments, although an example in which the present invention is applied to a DVD recorder as the electronic apparatus is described, the present invention can also be applied to other electronic apparatuses. For example, the present invention can be applied to a DVD player, an amplifier and a tuner of a stereo system, a tuner of a television set, a main body of a personal computer (a section including a hard disk drive or the like), and the like.

The present application contains subject matter related to that disclosed in Japanese Priority Patent Application JP 2009-047029 filed in the Japan Patent Office on Feb. 27, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A chassis structure comprising:
   a chassis member including a receiving portion; and
   a case member including a contact surface portion mounted on the receiving portion, the contact surface portion not being fixed to the receiving portion but being movably supported by the receiving portion,
   wherein a positioning portion protruding in a direction intersecting a direction extending along the surface of the contact surface portion is provided in the receiving portion, and the case member is mounted on the chassis member while an edge of the contact surface portion is in contact with the positioning portion and a concave portion is provided at a top edge of the contact surface portion and the positioning portion is fitted into the concave portion to position the contact surface portion in a direction in which the top edge extends.

2. The chassis structure according to claim 1, wherein the positioning portion is provided at a plurality of positions.

3. The chassis structure according to claim 1, wherein an amount of protrusion of the positioning portion is set within a range between one and two times the plate thickness of the contact surface portion.

4. The chassis structure according to claim 1, wherein the receiving portion is one of a flat surface portion in surface contact with the contact surface portion, a curved surface portion in line contact with the contact surface portion, and a spherical surface portion in point contact with the contact surface portion.

5. The chassis structure according to claim 1, wherein:
   the case member is fixed to the chassis member,
   a depth of the case member is set to be larger than a depth of the chassis member, and
   a length from a fixed position at which the case member is fixed to the chassis member to the edge of the contact surface portion is set to be longer than a length from the fixed position to the positioning portion.

6. A chassis structure comprising:
   a chassis member including a receiving portion; and
   a case member including a contact surface portion mounted on the receiving portion, the contact surface portion not being fixed to the receiving portion but being movably supported by the receiving portion,
   a switch board on which a switch device is mounted is attached to the chassis member or the case member, and
   a direction in which an operational force for operating the switch device is inputted is set to be the same direction as a surface direction of the contact surface portion
   wherein a positioning portion protruding in a direction intersecting a direction extending along the surface of the contact surface portion is provided in the receiving portion, and, the case member is mounted on the chassis member while an edge of the contact surface portion is in contact with the positioning portion.

7. An electronic apparatus comprising:
   a chassis member including a receiving portion;
   a case member including a contact surface portion mounted on the receiving portion, the contact surface portion not being fixed to the receiving portion but being movably supported by the receiving portion; and
   an electronic apparatus main body,
   wherein a positioning portion protruding in a direction intersecting a direction extending along the surface of the contact surface portion is provided in the receiving portion, and the case member is mounted on the chassis member while an edge of the contact surface portion is in contact with the positioning portion and a concave portion is provided at a top edge of the contact surface portion and the positioning portion is fitted into the concave portion to position the contact surface portion in a direction in which the top edge extends.

* * * * *